United States Patent [19]

Kubo et al.

[11] Patent Number: 5,015,404
[45] Date of Patent: May 14, 1991

[54] OIL COMPOSITION CONTAINING HYDROGENATED OIL

[75] Inventors: Junichi Kubo, Yokohama; Nobuo Yokoyama, Tokyo; Hirotugu Kinoshita, Kawasaki, all of Japan

[73] Assignee: Nippon Oil Co., Ltd., Minato, Japan

[21] Appl. No.: 333,706

[22] Filed: Apr. 5, 1989

[30] Foreign Application Priority Data

| Apr. 5, 1988 | [JP] | Japan | 63-082150 |
| Apr. 5, 1988 | [JP] | Japan | 63-082151 |
| Jun. 6, 1988 | [JP] | Japan | 63-138970 |
| Jun. 6, 1988 | [JP] | Japan | 63-138971 |
| Jul. 1, 1988 | [JP] | Japan | 63-165294 |
| Jul. 1, 1988 | [JP] | Japan | 63-165295 |

[51] Int. Cl.$^5$ .............. C10M 105/06; C10M 111/02
[52] U.S. Cl. .................. 252/49.6; 252/56 S; 252/56 R; 252/50; 208/19
[58] Field of Search .......... 252/56 R, 49.6, 56 S, 252/50; 208/19

[56] References Cited

U.S. PATENT DOCUMENTS

| 3,759,817 | 9/1973 | Mills et al. | 208/19 |
| 3,915,871 | 10/1975 | Bryer et al. | 208/19 |
| 3,970,543 | 7/1976 | McIntosh | 208/19 |
| 4,213,845 | 7/1980 | Masada | 208/19 |
| 4,385,984 | 5/1983 | Bijwaard et al. | 208/19 |

Primary Examiner—Jacqueline V. Howard
Attorney, Agent, or Firm—Keil & Weinkauf

[57] ABSTRACT

An oil composition contains 100 parts by weight of a base oil selected from the group consisting of mineral base oil, synthetic base oil and mixtures thereof, and 0.1 to 20 parts by weight of a hydrogenated oil obtained by hydrogenating an oil selected from the group consisting of coal type tar, oil produced by fractionating coal type tar, a hydrocarbon obtained by thermally cracking petroleum and having a boiling point of not lower than 200° C., a hydrocarbon obtained by catalytically cracking petroleum and having a boiling point of not lower than 200° C., a hydrocarbon obtained by catalytically reforming petroleum and having a boiling point of not lower than 200° C., and mixtures thereof, whereby the hydrogenated oil has the hydrogen-donating properties of not lower than three times the hydrogen-donating properties of the base oil at temperatures of not lower than 350° C.

23 Claims, 2 Drawing Sheets

OIL COMPOSITION CONTAINING HYDROGENATED OIL

BACKGROUND OF THE INVENTION

This invention relates to an oil composition and, more particularly, to an oil composition which undergoes thermal deterioration to a lesser extent when employed at elevated temperatures and which also undergoes oxidative deterioration to a lesser extent when employed under an oxidating atmosphere.

Lubricating oils are employed at present in a wide field of appliations, and are frequently subjected to extremely high temperatures. That is, although a system to be lubricated is seldom at an elevated temperature in its entirety, it occurs frequently that the system is subjected locally to elevated temperatures. For this reason, there are known lubricating oils employed as a thermal medium oil, such as, for example, mineral lubricating oil, diphenyl, diphenyl ether, alkylbenzene, alkylnaphthalene or 1-phenyl-1-xylylethane. These lube oils are deteriorated in properties owing to heat while producing carbonaceous materials and sludges in combination with other factors, thus damaging the equipment. Although thermal stability is required of these lube oils employed for these applications, deterioration and formation of carbonaceous materials unavoidably occur under hostile conditions. For example, in the case of an engine oil, the inside of the cylinder is heated locally to an elevated temperature, due to heat of friction produced between the piston and the cylinder in the inside of the engine or to insufficient removal of combustion heat evolved by fuel combustion. Thus, the carbonaceous materials are produced in the inside of the cylinder to cause the sludge formation and engine troubles. Recently, attempts have been made to elevate the temperature in the engine by employing new materials, such as ceramics, as the engine material For this reason, more stringent demands for thermal stability tend to be placed on the engine oils and it is becoming a more and more crucial task to prevent thermal deterioration of lube oils and to prevent formation of carbonaceous materials and sludges. The same tendency may be seen in the case of a turbine oil and attempts have been made to adopt a ceramic gas turbine for motor cars through evolution of new materials. Inasmuch as the gases at higher than 1200° C. are introduced in this case into the turbine, more stringent demands for thermal stability are placed on the lube oils. Thus, it is becoming a crucial task to evolve a lube oil free from formation of carbonaceous materials or from thermal deterioration at elevated temperatures.

On the other hand, poor oxidation stability may be mentioned as one of the most vulnerable points of lube oils. Thus, not only the physical properties of the lube oils are changed gradually due to transmutation caused by oxidation, but the formation of sludges by polycondensation of oxidation products or corrosion of metals caused by formation of oxidation products occur unavoidably. For preventing these inconveniences, recipe oils containing anti-oxidation agents are used for normal usages, and a variety of anti-oxidation agents have been proposed for this purpose. However, these anti-oxidation agents have some or other weak points or defects and almighty anti-oxidation agents have not been evolved to date. The functions required of the anti-oxidation agents include, in addition to the properties of preventing oxidation under normal operating conditions, compatibility with base oils and the properties of not affecting the physical properties of the base oil, not impairing the function of other ingredients and of not forming harmful materials, such as sludges, due to deterioration or transmutation of the anti-oxidation agents themselves. None of the existing anti-oxidation agents satisfies these requirements simultaneously, while constraints are imposed on their usages and composition ratios. It is therefore necessary not only to make an endeavor to evolve almighty anti-oxidation agents, but to evolve variegated anti-oxidation agents having various functions, and to devise methods for using them to the best advantage.

On the other hand, a variety of synthetic oils have been evolved for usages not met by the mineral lubricant base oil. Of these, the synthetic hydrocarbon oils, typified by poly-α-olefins, are superior in various properties relating to lubrication, but are lower than the mineral oils in oxidation stability, so that they need be admixed necessarily with anti-oxidation agents.

In addition, the lube oils are not deteriorated solely by heat or by oxidation, but are deteriorated in a majority of cases by the action of both the heat and the oxidation. More specifically, the heat treating oil, used as the metal working oil, is required to be superior in oxidation stability, safety, cooling or quenching properties and brightness, when used as the quenching oil.

It has been known that the cooling properties among these properties may be suitably adjusted by adding an oil-soluble high molecular material into the oil, while the brightness may be improved by addition of a small amount of organic acids or esters. A majority of the presently marketed heat treating oils essentially contain petroleum and occasionally contain these materials.

However, since these oils are exposed to elevated temperatures, they undergo deterioration in properties, as mentioned hereinabove, to produce carbonaceous materials, which are then affixed to the surface of the workpiece to impair the brightness. The oils are similarly affected in their cooling properties so that the desired quenching properties may not be obtained, thus necessitating complicated management operations, such as changing the quenching conditions or replacing oils. On the other hand, the electrical discharge machining oil has come to be employed in a number of applications, and has centered about die machining, as a metal working oil for electrical discharge machining, which allows for precise machining by taking advantage of the precision of an artificially established electrical discharge phenomenon. This electrical discharge machining oil is subjected locally to elevated temperatures and thereby thermally cracked in part to produce thermally cracked products which then undergo polycondensation to produce the carbonaceous materials unavoidably. When contaminated by these carbonaceous materials, the machining oil may aggravate the operability or enlarge the discharge gap. Hence, it becomes necessary to keep the machining oil clean by filtration through a filter. However, the carbonaceous materials produced in such system generally contain small-sized particles having the particle size of not more than 1 micron, so that a highly strict demand is placed on the filter, while a complex equipment and a laborious operation are necessitated. Hence, the demand has been raised, such as those described above, especially the demand for an oil composition that is invulnerable to thermal deterioration and deterioration by oxidation.

On the other hand, hydrogen-donating materials have been known for many years, and frequently employed for liquefaction of coals, cracking of heavy oils or visbreaking. While tetrahydronaphthalene is most representative hydrogen-donating material, it has also been well-known that a hydride of a compound having at least two condensed aromatic rings or a compound having both an aromatic ring and a five-member ring also exhibits hydrogen-donating properties. However, there have not been made attempts for or reports on tests aimed at applying these hydrogen-donating materials for prevention of oxidation or formation of carbonaceous materials on the occasions of employing lube oils.

SUMMARY OF THE INVENTION

It is a principal object of the present invention to provide an oil composition which produces a lesser amount of carbonaceous materials during application at elevated temperatures and which is superior in oxidation stability.

It is another object of the present invention to provide an oil composition which is useful as metal working oils, such as thermal medium oil, heat treating oil or as electrical discharge machining oil.

The above and other objects of the invention will become apparent from the following description.

According to the present invention, there is provided an oil composition containing (i) 100 parts by weight of a base oil selected from the group consisting of mineral base oil, synthetic base oil and mixtures thereof, and (ii) 0.1 to 20 parts by weight of a hydrogenated oil obtained by hydrogenating an oil selected from the group consisting of coal type tar, oil produced by fractionating coal type tar, a hydrocarbon obtained by thermally cracking petroleum and having a boiling point of not lower than 200° C., a hydrocarbon obtained by catalytically cracking petroleum and having a boiling point of not lower than 200° C., a hydrocarbon obtained by catalytically reforming petroleum and having a boiling point of not lower than 200° C., and mixtures thereof, whereby the hydrogenated oil has the hydrogen-donating properties of not lower than three times the hydrogen-donating properties of the base oil at temperatures of not lower than 350° C.

PREFERRED EMBODIMENTS OF THE INVENTION

The present invention will be explained in detail hereinbelow.

The present inventors have directed their attention to the fact that the mechanism of producing carbonaceous materials at the time of the operations accompanied by decrease in molecular weight, such as liquefaction of coals or cracking of heavy type oils, and the mechanism of producing carbonaceous materials at the time of using lube oils, are essentially the same in nature, and found by experiments that the presence of hydrogen-donating materials is effective against formation of carbonaceous materials at the time of using lube oils and that the hydrogen-donating materials simultaneously have the function of the anti-oxidation agents. This finding has led to fulfilment of the present invention.

As the mineral base oil or the synthetic base oil of the present invention, any oil having the general lubricating viscosity may be employed. Thus, as the mineral base oil, various grade oils selected from the group consisting of, for example, 30 solvent neutral oil, SAE 10, SAE 20, SAE 30, SAE 50, brightstock, spindle oil, machine oil and mixtures thereof, may be employed. As the electrical discharge machining oil, kerosene, spindle oil or machine oil, may preferably be employed. As the synthetic base oil, the base oils selected from the group consisting of, for example, polybutene, α-olefin oligomer, alkylbenzene, alkylnaphthalene, diesters, polyol esters, polyglycols, polyphenyl ether, tricresyl phosphate, silicone oil, perfluoro alkylether, n-paraffin, diphenyl alkane, isoparaffin and mixtures thereof, may preferably be employed. As the electrical discharge machining oil, for example, polybutene, α-olefin oligomer, alkylbenzene, alkylnaphthalene, diesters, polyol esters, polyglycol, silicone oil, n-paraffin or isoparaffin, may preferably be employed As the thermal medium oil, 1-phenyl-1-xylylethane, which is a kind of diphenyl alkane and represented by the formula may most preferably be employed.

The hydrogenated oil added to the base oil according to the present invention should have superior hydrogen-donating properties with respect to the base oil. Also, it should be such a material as will donate hydrogen under the conditions in which the carbonaceous materials or high polymer materials are produced from the base oil under elevated temperatures while at the same time the sequence of the oxidating reactions of the base oil is effectively terminated under an oxidating atmosphere. On the other hand, the base oil is selected so as to be suited to the intended usages of the oil composition If an excess quantity of the hydrogenated oil is added to the base oil, the properties proper to the base oil are impaired and the properties as the oil composition is lost. Therefore, the amount of the hydrogenated oil added to the base oil is preferably small and nevertheless effective. From the practical standpoint, the amount of the hydrogenated oil which is added to the base oil should be in the range of from 0.1 to 20 parts by weight to 100 parts by weight of the base oil. The amount of the hydrogenated oil is preferably in the range of from 1 to 15 parts by weight, more preferably 1 to 10 and most preferably 2 to 8 parts by weight.

Also, the hydrogen-donating properties of the hydrogenated oil added to the base oil should be not less than three times, preferably not less than five times and more preferably not less than ten times those of the base oil. The present inventors have found that the hydrogenated oil obtained by hydrogenating the oils selected from the group consisting of coal type tar, oils obtained by fractionating coal type tar, hydrocarbon oils with a boiling point of not lower than 200° C., obtained upon thermal cracking, catalytic cracking or catalytic reforming of petroleum, and mixtures thereof, is effective as the hydrogenated oil meeting the above conditions. These oils contain larger amounts of a compound having at least two condensed aromatic rings and a compound having both an aromatic ring and an unsaturated five-member ring, which are hydrogenated to afford the hydrogen-donating properties to the oils. Although it is known that the base oil usually contains the aforementioned polycyclic aromatic compounds, it has been experimentally demonstrated that the contents of the compounds having satisfactory hydrogen-donating properties are so small that the hydrogen-donating properties of the base oil are extremely low. The coal type tar or the oils obtained upon fractionating same is preferably selected from the group consisting of a detergent oil, anthracene oil, tar oil, tar light oil, carbolic oil, naphthalene oil, pitch oil, creosote oil, liquified coal oil, and mixtures thereof. The hydrocarbons obtained by thermal cracking, catalytic cracking or catalytic reforming of petroleum is preferably selected from the group consisting of, for example, residual oils from apparatus for thermal cracking of naphtha, cycle oils from apparatus for fluid catalytic cracking process (FCC), slurry oil from apparatus for fluid catalytic cracking process, decanted oil from apparatus for fluid catalytic cracking process (DCO), residual oils from apparatus for catalytic reforming of naphtha, cracked tar from apparatus for thermal cracking of crude oil, and mixtures thereof. Most desirable are hydrocarbons having a boiling point of not lower than 250° C.

Although there is no limitation to the methods for hydrogenating the oils, a method is usually employed in which the hydrogenation is carried out by a hydrogen gas in the presence of a catalyst exhibiting the function of hydrogenation. There is no limitation to the catalysts having the function of hydrogenation and any catalysts known in the art of hydrogenating oil distillates may be employed. More specifically, these catalysts may be exemplified by hydrotreating catalysts such as sulfides or oxides of at least one metal selected from the V to VIII group of the periodic table, especially at least one metal selected from nickel, cobalt, molybdenum, vanadium and tungstene, supported on an inorganic carrier such as alumina, silica, silica-alumina or cation-substituted zeolite, and hydrogenating catalysts for aromatic hydrocarbons, such as nickel, nickel oxide, nickel-copper, platinum, platinum oxide, platinum-rhodium, platinum-lithium, rhodium, palladium, cobalt, Raney-cobalt or ruthenium, supported on an inorganic carrier, such as activated charcoal, alumina, silica-alumina, diatomaceous earth or zeolite. As the conditions of hydrogenating the above oils in the presence of the catalysts having the hydrogenating function, the temperature of 300° to 400° C. and the pressure of 30 to 150 atom. are preferred in the case of the hydrotreating catalysts other than the hydrogenating catalysts for aromatic hydrocarbons, while the temperature of 150° to 300° C. and the pressure of 30 to 150 atom. are preferred in the case of the hydrogenating catalysts for aromatic hydrocarbons. There is also no limitation to the reaction apparatus and hydrogenated oils having satisfactory hydrogen-donating properties may be prepared by using a customary fixed-bed reaction apparatus. There are contained in the thus produced hydrogenated oils hydrogen-donating substances, such as, for example, dihydronaphthalene, tetrahydronaphthalene, dihydroanthracene, dihydrophenanthrene, tetrahydroanthracene, tetrahydrophenanthrene, octahydroanthracene, octahydrophenanthrene, 5, 6, 7, 8-tetrahydro-2-naphtol and 1, 2, 3, 4-tetrahydroquinoline. Although these substances may be used alone, it is not desirable economically.

According to the present invention, the hydrogen-donating properties of oils such as hydrocarbons and coal type tars may be assessed by a method which relies upon the captured amount of the migrating hydrogen using hydrogen acceptors. More specifically, the sample and the hydrogen acceptor, such as anthracene, are reacted under a predetermined condition, and the amount of the hydrogenated hydrogen acceptors is analyzed by, for example, gas chromatography, after termination of the reaction.

More specifically, the above oil sample and anthracene are charged into an autoclave fitted with a stirrer at a predetermined weight ratio of sample to anthracene of $\frac{1}{2}$ and are reacted therein for 30 minutes at a temperature of not lower than 350° C., for example, 350° to 450° C., and a $N_2$ pressure of 50 kg/cm$^2$·g, in the absence of catalysts. The amounts of 9, 10-dihydroanthracene, 1, 4, 5, 8-tetrahydroanthracene, 1, 2, 3, 4-tetrahydroanthracene and 1, 2, 3, 4, 5, 6, 7, 8-octahydroanthracene before and after the reaction, and the amount of residual anthracene, are analyzed by gas chromatography. Inasmuch as the hydrogen used for generating hydrides of these anthracenes is supplied from the above oils having the hydrogen-donating properties, the amount of hydrogen migrated from these oils to anthracenes (hydrogen atom/mol anthracene) is found and measured as the hydrogen-donating properties. It is noted that this method is pursuant to the method described in Yokono T., Marsh H. and Yokono. M, "Fuel", 60, 607 (1981).

These substances may be added to the base oil at the stage of producing the oil composition at the oil refinery or at the stage of using the oil composition by the user. Or alternatively, the oil containing the compound having at least two condensed aromatic rings or the compound having both an aromatic ring and a five-member ring is hydrogenated along with the base oil, at the stage of producing the base oil, for producing the base oil simultaneously with the hydrides.

The oil composition of the present invention may be admixed further with thickening agents These thickening agents may include, for example, lithium soap, calcium complex soap, sodium terephthalamate, benton, indanthrene, diurea, polyurea or urea-urethane. These thickening agents are usually added in an amount of 2 to 30 parts by weight and preferably 3 to 20 parts by weight to 100 parts by weight of the base oil.

Also, various additives are usually added to the oil composition for improving the properties. These additives may be added to the oil composition of the present invention without any inconveniences. These additives are preferably selected from the group consisting of an anti-oxidation agent, detergent-dispersant, viscosity index improver, pour point depressant, oiliness agent, anti-wear agent, extreme pressure agent, corrosion inhibitor, metal-deactivator, rust inhibitor, defoaming agent, emulsifier, anti-emulsifier, disinfectant, coloring agent, high polymer substances, such as ethylene-propylene copolymer, brightening improver, cooling improver, and mixtures thereof. When the oil composition of the present invention is employed as the heat treating oil, which is a metal working oil, it is preferred to add a brightening improver and/or a cooling improver, such as asphalt, polyvinyl chloride, polystyrene, acrylontrile-styrene resin, polymethacrylate, silicone resin or polyvinyl butyral, to the composition. The details of these various additives are described for example in "Journal of Lubricating Oil Association", vol. 15, No.6 or in "Additives for Petroleum Products", edited by Toshio Sakurai, published by Saiwai-Shobo. The total amount of addition of these various additives is preferably not more than 10 parts by weight, more preferably not more than 5 parts by weight and most preferably not more than 3 parts by weight to 100 parts by weight of the oil composition.

These hydrogen-donating substances exhibit their properties more conspicuously at elevated temperatures. In general, their effects become apparent at a temperature of not lower than 350° C., there being no specific upper limit temperature above which the effects of these substances are lost. It has been demonstrated that these substances remain effective at 800° C. so that they are particularly effective for use with oil compositions frequently subjected to locally elevated temperatures.

The oil composition of the present invention may be used for example as the lube oils for internal combustion engines, industrial lubricating oils, turbine oils, aircraft oils, vessel oils, mold release agents, industrial greases, metal working oils, thermal medium oils, slide guiding surface oil or bearing oil. More specifically, it may be employed in, for example, gasoline engine oil, diesel engine oils, such as land or vessel diesel engine oil, aircraft engine oil, turbine oil, such as turbine oil containing or not containing additives, gas turbine oil or vessel tubine oil, gear oil such as industrial gear oil, gear oil for vehicles or automatic transmission system, hydraulic pressure oil, compressor oil, refrigerator oil, or metal working oil, such as machining oil, grinding oil or plastic working oil. Above all, it is preferably employed as the metal working oil, such as heat treating oil or electrical discharge machining oil, or as the thermal medium oil.

The oil composition of the present invention contains 0.1 to 20 parts by weight of the hydrogenated oil having hydrogen-donating properties thrice those of the base oil, so that it is effective to prevent degradation of the oil by heat or oxidation or formation of the carbonaceous materials, while it is also effective to prevent deterioration of the oil quality when used as the industrial greases. It is effective above all as the metal working oil or as the thermal medium oil.

EXAMPLES OF THE INVENTION

The present invention will be explained with reference to experiments, comparative experiments, examples and comparative examples. However, these are given by way of illustration only and are not intended for limiting the scope of the invention.

EXPERIMENTS 1 TO 7 AND COMPARATIVE EXPERIMENTS 1 TO 4

The following experiments were conducted for comparing the hydrogen-donating properties of the base oil and the hydrogenated oil. The SAE 10, SAE 30, SAE 50 and kerosene from Arabic crude oil, all of which had been refined by hydrogenation, were used as the base oil, while hydrides of anthracene oil, creosote oil, naphthalene oil, residual oil from apparatus for thermal cracking of naphtha, having a boiling point of 200° C., residual oil from apparatus for catalytic cracking of naphtha, having a boiling point of 200° C., decanted oil from apparatus for fluid catalytic cracking process (FCC), having a boiling point of 200° C. and a detergent oil having a boiling point of 200° C., were used as the hydrogenated oil.

In conducting these experiments, the samples and anthracene were reacted under predetermined conditions, and the amount of migration of hydrogen was found from the amount of hydrogen that was added to anthracene.

The base oil of the SAE 10, SAE 30, SAE 50 and kerosene were reacted with anthracene under the predetermined conditions shown in Table 1. After the reaction, the amounts of 9, 10-dihydroanthracene, 1, 2, 3, 4-tetrahydroanthracene and 1, 2, 3, 4, 5, 6, 7, 8-octahydroanthracene were analyzed by gas chromatography. In this manner, the amount of hydrogen migrated from each base oil sample to anthracene could be grasped. The results are shown in Table 3.

On the other hand, the hydrides obtained by hydrogenating anthracene oil, creosote oil, naphthalene oil, residual oil from apparatus for thermal cracking of naphtha, residual oil from apparatus for catalytic cracking of naphtha, decanted oil from apparatus for fluid catalytic cracking process and detergent oil under predetermined conditions shown in Table 2 were reacted with anthracene under the conditions shown in Table 1, and the amounts of 9, 10-dihydroanthracene, 1, 4, 5, 8-tetrahydroanthracene, 1, 2, 3, 4-tetrahydroanthracene, 1, 2, 3, 4, 5, 6, 7, 8-octahydroanthracene and antracene before and after the reaction, were analyzed by gas chromatography. The increment and decrement of these amounts before and after the reaction were found to find the amount of the hydrogen migrated from the hydrides of anthracene oil, creosote oil, naphthalene oil, residual oils from apparatus for thermal cracking of naphtha, residual oil from apparatus for catalytic cracking of naphtha, decanted oil from apparatus for fluid catalytic cracking process and detergent oil to anthracene (atom/mol-anthracene). The amount of hydrogen migrated from each base oil to anthracene and the amount of hydrogen migrated from the hydride to anthracene, are shown collectively in Table 3.

It is seen from this Table that the amount of hydrogen migrated from each base oil is extremely small, whereas that from hydrogenated oil is markedly larger, with the hydrogen-donating properties of the hydrogenated oil being not less than thrice and, for example, 10 to 30 times those of each base oil.

TABLE 1

| Conditions for Experiments on Hydrogen-Donating Properties | |
| --- | --- |
| Reaction Temperature | 430° C. |
| Reaction Pressure | 50 kg/cm$^2$ · g (N$_2$ prssure) |
| Reaction Time | 30 minutes |
| Catalysts | none |
| Experimental Device | Inner Capacity, 1 lit.; Magnetic Stirring Type Autoclave |
| Sample/Anthracene (wt. ratio) | ½ |

TABLE 2

| Hydrogenating Conditions | |
| --- | --- |
| Reaction Temperature | 370° C. |
| Reaction Pressure | 75 kg/cm$^2$ · g (H$_2$) |

TABLE 2-continued

| Hydrogenating Conditions | |
|---|---|
| LHSV | 1.0 |
| Catalysts | Co—Mo—Al$_2$O$_3$; Marketed Desulfurization Catalyst |
| Reaction Device | Fixed Bed Reaction System with Downwardly Directed Stream |

TABLE 3

Results of Experiments on Migrated Amount of Hydrogen

| System | Migrated Amount of Hydrogen (H atom/mol-Anthracene) |
|---|---|
| Comp. Experiments | |
| 1 SAE-10/Anthracene | 0.030 |
| 2 SAE-30/Anthracene | 0.033 |
| 3 SAE-50/Anthracene | 0.039 |
| 4 Kerosene/Anthracene | 0.027 |
| Experiments | |
| 1 Hydrogenated Anthracene Oil/Anthracene | 0.85 |
| 2 Hydrogenated Creosote Oil/Anthracene | 0.97 |
| 3 Hydrogenated Naphthalene oil/Anthracene | 0.67 |
| 4 Hydride of Residual Oil from Thermal Cracking of Naphtha/Anthracene | 0.71 |
| 5 Hydride of Residual Oil from Catalytic Reforming of Naphtha/Anthracene | 0.69 |
| 6 Hydride of Decanted Oil from FCC/Anthracene | 0.48 |
| 7 Hydride of Detergent oil/Anthracene | 0.87 |

EXAMPLES 1 AND 2 AND COMPARATIVE EXAMPLE 1

Figure 1:
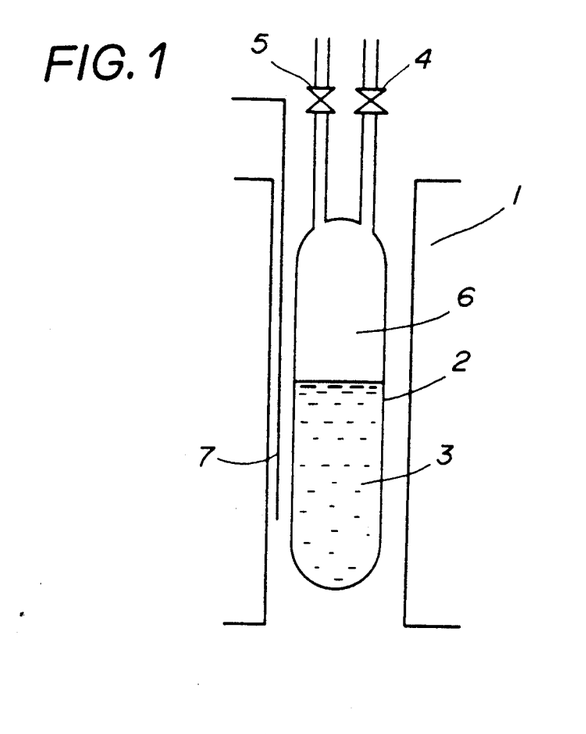
FIG. 1 is a diagrammatic view showing a thermal stability test device employed in an embodiment of the present invention.

In Comparative Example 1, SAE-30 base oil shown in Comparative Experiment 2 was charged into a sample vessel 2 of a thermal stability test unit shown in FIG. 1. In Example 1, a mixture of 100 parts by weight of the SAE-30 base oil and 5 parts by weight of hydrogenated anthracene oil shown in Experiment 1 was charged into the sample vessel 2 and, in Example 2, a mixture of 100 parts by weight of the SAE-30 base oil and 5 parts by weight of a hydride of residual oil from apparatus for thermal cracking of naphtha shown in Experiment 4 was charged into the sample vessel 2. After each sample was allowed to stand for 24 hours at 450° C. at 2 kg/cm$^2$·g (N$_2$ pressure), the state of formation of carbonaceous materials was observed, and the contents of insoluble toluene were measured. In Comparative Example 1, the carbonaceous materials were apparently seen to be precipitated, while the contents of undissolved toluene were 5.8 wt.%/base oil. In Examples 1 and 2, the carbonaceous materials were not seen to be precipitated, and the contents of undissolved toluene were 0.2 wt.%/base oil for Example 1 and 0.36 wt.%/base oil for Example 2.

In the test system shown in FIG. 1, the numeral 1 denotes an electrical furnace, the numeral 2 denotes a sample vessel, the numeral 3 denotes a test sample, the numerals 4 and 5 denote valves, the numeral 6 denotes nitrogen and the numeral 7 denotes a thermometer.

EXAMPLES 3 AND 4 AND COMPARATIVE EXAMPLE 2

Figure 2:
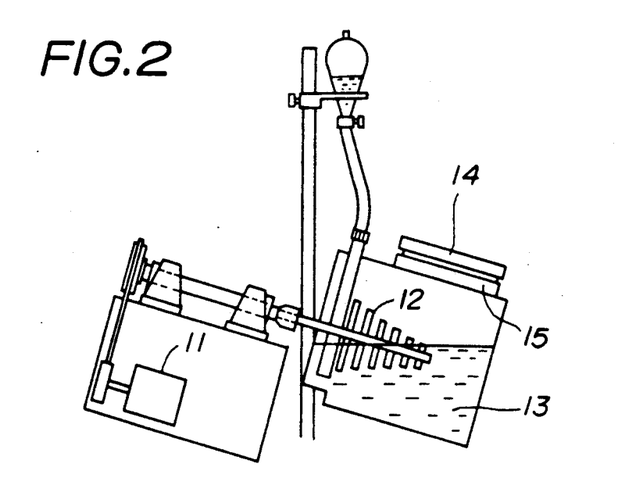
FIG. 2 is a diagrammatic view showing a panel coking test device.

Panel coking tests were conducted on SAE 30 base oil employed in Comparative Experiment 2. FIG. 2 diagrammatically shows these tests, in which a sample oil 13 maintained at a predetermined temperature is splashed upwards by a metal piece 12, rotated by an electric motor 11, so as to be affixed to a panel heater 14 provided at an upper position. The stability of the oil was evaluated by the coking state of the oil film descending on a metal surface adjusted to a predetermined temperature by the panel heater 14. Although the panel coking tests are usually conducted at a temperature o approximately 300° C., the testing device was remodelled for use at higher temperatures for carrying out the present experiments. The tests were conducted under the following conditions:

Oil temperature: 100° C.

Oil splashing: the operating cycle of 15 seconds of operation and 45 seconds of cessation Panel surface temperature : 390° to 400° C.

Test time: 5 hours

The following test results were obtained:

| | Amount of coking |
|---|---|
| Comp. Ex. 2, Only SAE-30 base oil | 5.8 wt. %/sample oil |
| Ex. 3, 100 parts by weight of SAE-30 base oil and 5 parts by weight of hydride of creosote oil | 0.3 wt. %/sample oil |
| Ex. 4, 100 parts by weight of SAE-30 base oil and 5 parts by weight of residual oil from apparatus for catalytic reforming of naphtha | 0.40 wt. %/sample oil |

EXAMPLE 5

A turbo blower bearing for a precipitator (inside diameter:30 nm) was lubricated by an oil bath lubrication (1700 r.p.m.; motor output, 40 kW). Burning troubles occurred frequently due to carbon precipitation at the bearing. A lube oil (JIS ISO VG 150) admixed with a hydride of anthracene oil obtained in the same way as in Experiment 1 and having the hydrogen-donating properties about 20 times those of the base oil, at a ratio of 100 parts by weight of the base oil to 10 parts by weight of the hydride, was used as the lube oil. As a result, carbon precipitation at the bearing was reduced to about twentieth, while the driving time was prolonged about five times.

EXAMPLE 6

The procedure of Example 5 was followed except that the hydride of the residual oil from apparatus for catalytic cracking of naphtha having the hydrogen-donating properties about 20 times those of the base oil was added to the base oil in place of the hydride of anthracene oil. As a result, carbon precipitation at the bearing was reduced to about fifteenth, while the driving time was prolonged about four times.

EXAMPLE 7 AND 8 AND COMPARATIVE EXAMPLE 3

In Comparative Example 3, the SAE 50 base oil shown in Comparative Experiment 3 was charged into an autoclave test device having the inner capacity of 100 ml and fitted with an inner stirring system. In Example 7, a mixture of 100 parts by weight of the SAE 50 base oil and 5 parts by weight of the hydrogenated anthracene oil shown in Experiment 1 was charged into the same autoclave test device and, in Example 8, a mixture of 100 parts by weight of SAE 50 base oil and 5 parts by weight of the hydride of residual oil from apparatus for thermal cracking of naphtha shown in Experiment 4 was charged into the same device. The stirring by the inner stirring system was continued at 400° C. for 72 hours. It is noted that nitrogen was used as the gas phase, the temperature of which was raised after pressurizing to an initial pressure of 5 kg/cm$^2$. After lapse of 72 hours, the contents of the device were taken out to observe the state of formation of the carbonaceous materials and to measure the contents of the undissolved toluene contents. The results are shown in Table 4.

EXAMPLES 9 AND 10 AND COMPARATIVE EXAMPLE 4

Figure 3:
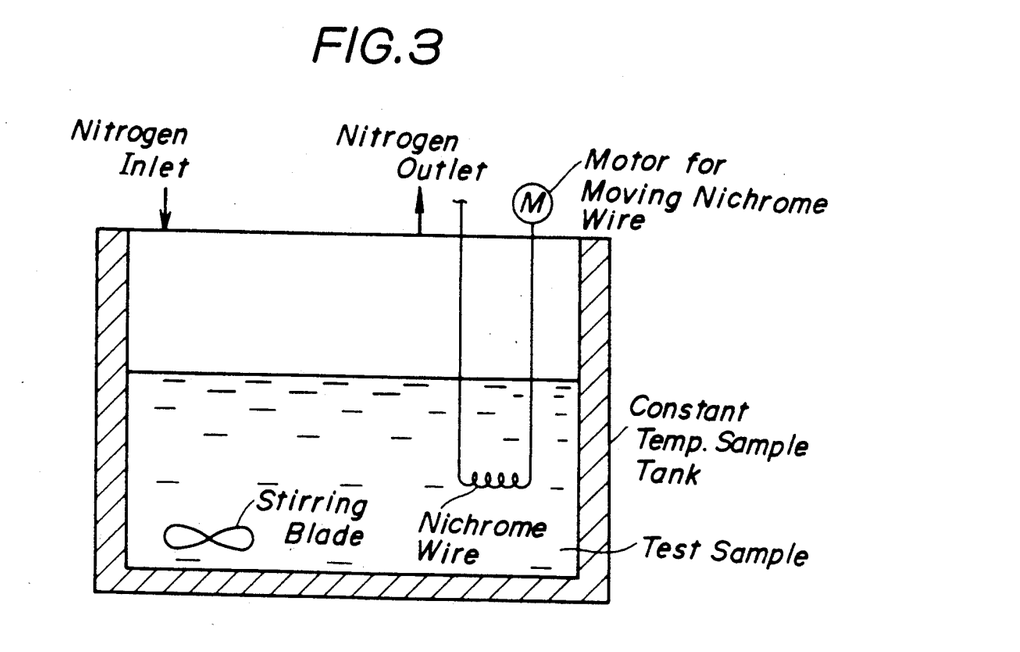
FIG. 3 is a diagrammatic view showing another thermal stability test device employed in another embodiment of the present invention.

In Comparative Example 4, the SAE 30 base oil shown in Comparative Experiment 2 was charged into a hermetically sealed stainless steel constant temperature vessel shown in FIG. 3. In Example 9, a mixture of 100 parts by weight of the SAE 30 base oil and 7 parts by weight of hydrogenated creosote oil shown in Experiment 2 was charged into the same vessel and, in Example 10, a mixture of 100 parts by weight of the SAE 30 base oil and 7 parts by weight of the hydride of residual oil from catalytic reforming of naphtha shown in Experiment 5 was charged into the same vessel. In any of these cases, a nichrome wire heated to a surface temperature of approximately 800° C. was immersed in the liquid, and the vessel was heated to maintain the liquid temperature at 200° C. while the liquid was stirred. The gas phase was replaced by nitrogen. After this state was continued for 1,500 hours, the liquid was sampled to observe the state of formation of the carbonaceous materials in the liquid and to measure the undissolved toluene contents. The results are also shown in Table 4.

TABLE 4

|  | Status of Formation of Carbonaceous Materials | Undissolved Toluene Contents (wt. %/base oil) |
| --- | --- | --- |
| Ex. 7 | Not Observed with Nacked Eyes | 0.4 |
| Ex. 8 | Same as above | 0.16 |
| Ex. 9 | Same as above | 0.7 |
| Ex. 10 | Same as above | 0.21 |
| Comp. Ex. 3 | Carbonaceous Materials Were Seen to Have Been Formed | 9.1 |
| Comp. Ex. 4 | Same as above | 6.1 |

EXAMPLE 11 AND COMPARATIVE EXAMPLE 5

In Comparative Example 5, the SAE 30 base oil sample shown in Comparative Experiment 2 was put to a test on thermal stability, using a thermal stability test device shown in FIG. 3. On the other hand, in Example 11, a mixture of 100 parts by weight of the SAE-30 base oil and 5 parts by weight of a hydride of decanted oil from apparatus for fluid catalytic cracking process shown in Experiment 6 was put as a sample to a test on thermal stability, using the same test device shown in FIG. 3. Thus, as shown in FIG. 3, the sample oil was charged into a constant temperature vessel and maintained at 100° C., and cyclic operations each consisting in immersing a red-hot nichrome wire heated to a surface temperature of 900° C. for 20 seconds and hoisting the wire for 40 seconds were repeated 1,500 times. The gas phase was purged with nitrogen to prevent oil burning. The sample oil was then taken out to observe the presence or absence of carbonaceous materials and to measure the undissolved toluene contents. The following results were obtained.

Example 11: The carbonaceous material was not seen to have been formed on visual observation; the contents of undissolved toluene were 0.07 wt. %.

Comparative Example 5: The carbonaceous materials were seen to have been formed by visual check; the contents of undissolved toluene were 2.13 wt. %.

EXAMPLES 12 AND 13 AND COMPARATIVE EXAMPLE 6

In Comparative Example 6, the SAE 50 base oil sample shown in Comparative Experiment 3 was put to a test on thermal stability, using a thermal stability test device shown in FIG. 3, as in Example 11 and Comparative Example 5. On the other hand, in Example 12, a mixture of 100 parts by weight of the SAE 50 base oil and 5 parts by weight of a hydrogenated creosote oil shown in Experiment 2 was put as a sample to a test on thermal stability, using the same test device shown in FIG. 3. Similarly, in Example 13, a mixture of 100 parts by weight of SAE 50 base oil and 5 parts by weight of hydride of the residual oil from apparatus for thermal cracking of naphtha shown in Experiment 4, freed of light fractions boiling at not higher than 250° C., was put as a sample to a test on thermal stability, using the same device shown in FIG. 3. The following results were obtained.

Example 12: The carbonaceous material was not seen to have been formed on visual observation; the contents of undissolved toluene were 0.05 wt.%.

Example 13: The carbonaceous material was not seen to have been formed on visual observation; the contents of undissolved toluene were 0.07 wt. %.

Comparative Example 6: The carbonaceous materials were seen to have been formed by visual check; the contents of undissolved toluene were 3.05 wt. %.

EXAMPLES 14 AND 15 AND COMPARATIVE EXAMPLE 7

Figure 4:
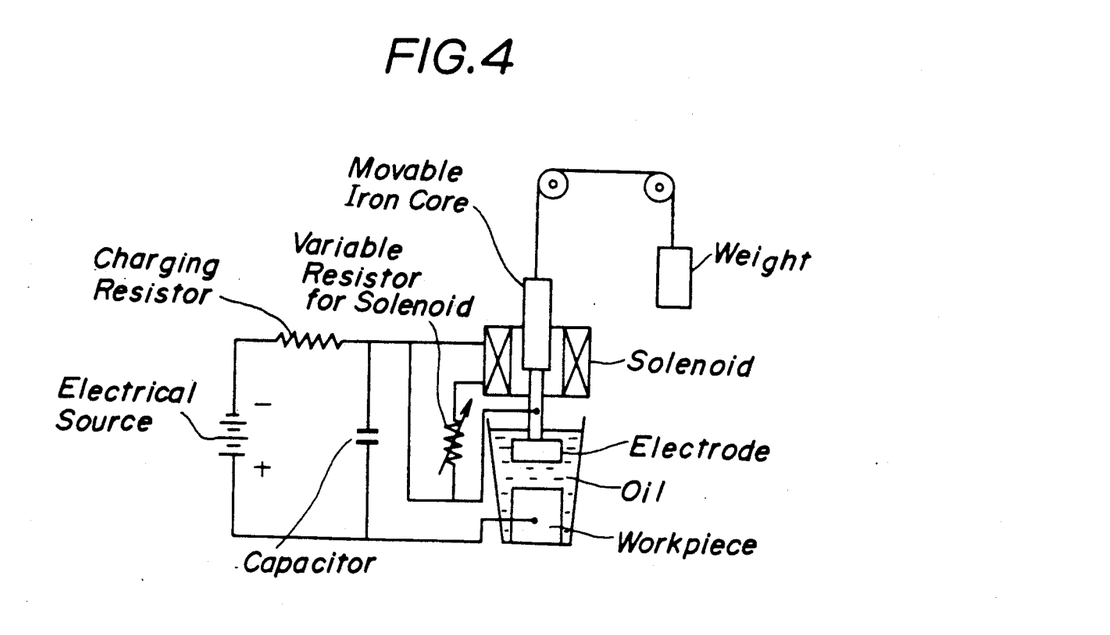
FIG. 4 is a diagrammatic view showing an electrical discharge machining unit.

Deep hole boring was performed under the machining conditions shown in Table 5, using an electrical discharge machining device shown in FIG. 4. In Comparative Example 7, the kerosene of the base oil not admixed with hydrogenated oil was used as the sample and, in Examples 14 and 15, a mixture of 100 parts by weight of the kerosene as the base oil and 5 parts by weight of the detergent oil obtained from coal type tar shown in Experiment 7 and hydrogenated under the conditions shown in Table 2 and a mixture of 100 parts by weight of the kerosene as the base oil and 5 parts by weight of hydrogenated naphthalene oil shown in Experiment 3 and hydrogenated under the conditions shown in Table 2, were used as the samples, respectively. The same machining operations were performed for these Examples, and the states of the liquids were observed visually after termination of the machining operations, while the contents of undissolved toluene were measured. The results are shown in Table 6.

TABLE 5

| Electrical Discharge Machining Conditions | |
|---|---|
| Electrode Polarity | (+) |
| Mean Machining Voltage (V) | 75–82 |
| Mean Machining Current (A) | 5.6 |
| Machining Time (Min.) | 1,200 |
| Electrode | Cu |
| Workpiece | SKP 11 |
| Vol. of Machining Liquid (l) | 90 |

TABLE 6

Results of Experiments on Electrical Discharge Machining

| | Results of Visual Check of Carbonaceous Materials | Undissolved Toluene Contents (wt. %) |
|---|---|---|
| Ex. 14 | None | 0.3 |
| Ex. 15 | None | 0.4 |
| Comp. Ex. 7 | Carbonaceous Materials Were Formed | 7.5 |

EXAMPLES 16 TO 19 AND COMPARATIVE EXAMPLE 8

The oxidation stability of samples having the compositions shown in Table 7 was evaluated by a rotary bomb type oxidation test according to ASTM D2272 (abbreviated to RBOT test). The results are shown in Table 4. As shown therein, durability to oxidation of the samples is improved by adding a hydride of anthracene oil or a hydride of residual oil from apparatus for catalytic reforming of naphtha to the poly-α-olefin base oil.

TABLE 7

Results of RBOT Tests (Oil Quantity, 50 g; Oxygen, 6.3 kgf/cm², Temp., 150° C.)

| | Base Oil | Additive | Addition Amount (wt. %) | Durability to Oxidation (Min.) |
|---|---|---|---|---|
| Comp. Ex. 8 | Poly-α-olefin (Note) | None | 0 | Not More Than 20 |
| Ex. 16 | Poly-α-olefin | Hydride of Anthracene Oil | 1 | 33 |
| Ex. 17 | Poly-α-olefin | Hydride of | 5 | 53 |

TABLE 7-continued

Results of RBOT Tests (Oil Quantity, 50 g; Oxygen, 6.3 kgf/cm², Temp., 150° C.)

| | Base Oil | Additive | Addition Amount (wt. %) | Durability to Oxidation (Min.) |
|---|---|---|---|---|
| Ex. 18 | Poly-α-olefin | Anthracene Oil Hydride of Reformed Residual Oil | 1 | 24 |
| Ex. 19 | Poly-α-olefin | Hydride of Reformed Residual Oil | 5 | 39 |

Note:
Viscosity 46.6 cst at 40° C.

EXAMPLES 20 TO 23 AND COMPARATIVE EXAMPLE 9

The susceptibility to oxidation of the samples of the compositions shown in Table 8 was evaluated by the test on thermal stability according to JIS K-2540. The results are shown in Table 8. As shown therein, by adding the hydrides of the coal tar oil or residual oil from apparatus for thermal cracking of naphtha to the mineral base oil SAE-10, oxidation was suppressed, as indicated by the acid value, while the amount of the sludge formation was reduced.

TABLE 8

Results of Test on Thermal Stability
(Oil Quantity, 20 g; Temperature, 175° C.; Time, 48 Hours)

| | Base Oil | Additive | Addition Amount (wt. %) | Acid Value (KOH mg/g) | Produced Sludge Amount (mg) |
|---|---|---|---|---|---|
| Comp. Ex. 9 | SAE-10 | None | 0 | 0.52 | 46.0 |
| Ex. 20 | SAE-10 | Hydride of Tar Oil | 5 | 0.30 | 28.1 |
| Ex. 21 | SAE-10 | Hydride of Tar Oil | 0.5 | 0.36 | 35.8 |
| Ex. 22 | SAE-10 | Hydride of Residual Cracked Oil | 5 | 0.36 | 30.5 |
| Ex. 23 | SAE-10 | Hydride of Residual Cracked Oil | 0.5 | 0.41 | 36.7 |

EXAMPLES 24 TO 27 AND COMPARATIVE EXAMPLES 10 TO 13

Hot tube tests were conducted for investigating into the oxidation behavior at elevated temperatures. In a hot tube test, by way of checking the oxidation behavior, a minor amount of a sample oil is passed upwardly through the inside of a narrow glass tube erected upright in a heating oven, as it is accompanied by air bubbles.

The test device employed was "HT-101-2" manufactured by Komatsu Engineering Co. Ltd., having the inside diameter of a tube of 2 mm and the length of the heated portion of 12 cm. The flow rate of the sample oil was 0.3 cc/hr, the residence time at the elevated temperature section was 75 minutes, and the air flow rate was 10 cc/min.

The compositions of the sample oils and the results of the oxidation tests are as shown in Table 9, from which it is seen that the hydrides of coal tar oil or of cracked tar from apparatus for thermal cracking of crude oil is effective for preventing oxidation even at the elevated temperatures of 280° to 300° C.

TABLE 9

| | Base Oil | Additive | Hot Tube Test Addition Amount (wt. %) | Temperature (°C.) | Acid Value (mg/g) | Oxygen Contents (wt. %) |
|---|---|---|---|---|---|---|
| Ex. 24 | Poly-α-olefin | Hydride of Coal Tar Oil | 10 | 280 | 9.9 | 3.3 |
| Comp. Ex. 10 | Same as above | None | 0 | 280 | 20.1 | 6.2 |
| Ex. 25 | Same as above | Hydride of Coal Tar Oil | 10 | 300 | 10.9 | 3.7 |
| Comp. Ex. 11 | Same as above | None | 0 | 300 | 20.7 | 6.7 |
| Ex. 26 | Same as above | Hydride of Cracked Tar | 10 | 280 | 9.9 | 3.7 |
| Comp. Ex. 12 | Same as above | None | 0 | 280 | 20.1 | 6.2 |
| Ex. 27 | Same as above | Hydride of Cracked Tar | 10 | 300 | 10.9 | 4.4 |
| Comp. Ex. 13 | Same as above | None | 0 | 300 | 20.7 | 6.7 |

EXAMPLES 28 AND 29 AND COMPARATIVE EXAMPLES 14 TO 17

The effects of addition to the industrial lithium soap type grease of the hydrides of anthracene oil or of reformed residual oil from apparatus for catalytic reforming of naphtha were checked by the following experiments.

TABLE 10

Results of Tests on Oxidation of Greases (130° C.)

| | | Heating Days | | | | | | | |
|---|---|---|---|---|---|---|---|---|---|
| | | 3 | | 5 | | 10 | | 11 | |
| | Sample | Appearance | CO Absorbance | Appearance | CO Absorbance | Appearance | CO Absorbance | Appearance | CO Absorbance |
| Comp. Ex. 14 | No Additive | Light Brown, Not Fluid | 0.17 | Deep Brown, Not Fluid | 0.37 | Black-Brown, Fluid | 1.72 | Black-Brown, Briskly Fluid | 1.88 |
| Ex. 28 | Hydride of Anthracene Oil, 10 wt. % Added | Brown, Not Fluid | 0.09 | Black-Brown, Not Fluid | 0.17 | Black-Brown, Not Fluid | 0.29 | Black-Brown, Not Fluid | 0.34 |
| Comp. Ex. 15 | DBPC, 0.5 wt. % Added | Light Brown, Not Fluid | 0.07 | Ligt to Medium Brown, Not Fluid | 0.29 | Black-Brown, Fluid | 0.37 | Black-Brown, Fluid | 0.81 |
| Comp. Ex. 16 | No Additive | Light Brown, Not Fluid | 0.17 | Deep Brown, Not Fluid | 0.37 | Black-Brown, Fluid | 1.72 | Black-Brown, Briskly Fluid | 1.88 |
| Ex. 29 | Hydride of Reformed Residual Oil, 10 wt. % Added | Brown, Not Fluid | 0.09 | Black-Brown, Not Fluid | 0.19 | Black-Brown, Not Fluid | 0.31 | Black-Brown, Not Fluid | 0.43 |
| Comp. Ex. 17 | DBPC, 0.5 wt. % Added | Light Brown, Not Fluid | 0.07 | Light to Medium Brown, Not Fluid | 0.29 | Black-Brown, Fluid | 0.37 | Black-Brown, Fluid | 0.81 |

A columnar piece of grease 40 mm in diameter and 3 mm in thickness was allowed to stand in a constant temperature vessel maintained at 130° C. in the presence of air and changes in appearance of the test piece with lapse of time were checked while the carbonyl absorbance indicating the degree of oxidation was measured. The results are shown in Table 10, along with the measured results for the above piece of grease admixed with 0.5 wt.% of 2, 6-di-tertiary-butyl-p-cresol, hereinafter referred to as DBPC, a typical anti-oxidation agent, for comparison sake. It is seen from Table 10 that the addition of the hydride of anthracene oil or of residual oil from naphtha reforming having hydrogen-donating properties results in significant suppression of oxidation, the effect of which is more acute than that of DBPC, a typical anti-oxidation agent. It is also seen that the samples not containing the anti-oxidation agent or DBPC become fluid after lapse of 11 days, whereas those admixed with the hydrides of anthracene oil or of residual oil from naphtha reforming are not fluid after lapse of 11 days at 130° C.

The following points have become clear from the above results:

(1) The hydrogen-donating properties of the base oil are low.

(2) The hydrogen-donating properties of hydrides of products obtained from coal type tar or from thermal cracking, catalytic cracking or catalytic reforming of petroleum are considerably higher than those of the base oil.

(3) Addition to the base oil of the hydrides of products obtained from coal type tar or from thermal cracking, catalytic cracking or catalytic reforming of petroleum results in a marked decrease in the amount of formation of the carbonaceous materials.

(4) It is unnecessary to use a larger amount of the hydrides of products obtained from coal type tar or from thermal cracking, catalytic cracking or catalytic reforming of petroleum and a sufficient effect may be achieved with addition of a few percent of the above hydrides in the above Examples.

(5) The above effect has been actually ascertained with a turbo-blower suffering from formation of the carbonaceous materials.

(6) It has been found that the oil composition of the present invention is highly useful above all in heat treating oil, thermal medium oil or metal working oil used as electrical discharge machining oil.

Above all, the following points have become clear from Examples 16 to 29.

(1) The hydrogen-donating substances have anti-oxidation effects.

(2) Thus, they have the effect of preventing sludge formation.

(3) The anti-oxidation effect is displayed from a lower temperature of approximately 150° C. to a higher temperature of approximately 300° C.

(4) Addition of the hydrogen-donating materials is also effective to prevent deterioration of industrial greases.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An oil composition comprising:
   (i) 100 parts by weight of a base oil selected from the group consisting of mineral base oil, synthetic base oil and mixtures thereof, and
   (ii) 0.1 to 20 parts by weight of a hydrogenated oil obtained by hydrogenating an oil selected from the group consisting of coal tar, oil produced by fractionating coal tar, a hydrocarbon obtained by thermally cracking petroleum and having a boiling point of not lower than 200° C., a hydrocarbon obtained by catalytically cracking petroleum and having a boiling point of not lower than 200° C., a hydrocarbon obtained by catalytically reforming petroleum and having a boiling point of not lower than 200° C., and mixtures thereof, whereby the hydrogenated oil has the hydrogen-donating properties of not lower than three times the hydrogen-donating properties of the base oil at temperatures of not lower than 350° C.

2. The oil composition according to claim 1 wherein said mineral base oil is selected from the group consisting of 30 solvent neutral oil, SAE 20, SAE 30, SAE 50, brightstock, spindle oil, machine oil and mixtures thereof.

3. The oil composition according to claim 1 wherein said synthetic base oil is selected from the group consisting of polybutene, α-olefin oligomer, alkylbenzene, alkylnaphthalene, diesters, polyol esters, polyglycols, polyphenyl ethers, tricresyl phosphate, silicone oil, perfluoro alkylether, n-paraffin, diphenyl alkane, isoparaffin and mixtures thereof.

4. The oil composition according to claim 3 wherein said diphenyl alkane is 1-phenyl-1-xylylethane.

5. The oil composition according to claim 1 wherein the hydrogenated oil contains a member of the group consisting of a compound having at least two condensed aromatic rings, a compound having both an aromatic ring and an unsaturated five-member ring and mixtures thereof.

6. The oil composition according to claim 1 wherein said oil selected from the group consisting of said coal tar, said oil produced by fractionating coal tar and mixtures thereof is selected from the group consisting of detergent oil, anthracene oil, tar oil, tar light oil, carbolic oil, naphthalene oil, pitch oil, creosote oil, liquefied coal oil, and mixtures thereof.

7. The oil composition according to claim 1 wherein said hydrocarbon has a boiling point of not lower than 250° C.

8. The oil composition according to claim 1 wherein said hydrocarbon is selected from the group consisting of residual oil from apparatus for thermal cracking of naphtha, cycle oil from apparatus for fluid catalytic cracking process, slurry oil from apparatus for fluid catalytic cracking process, decanted oil from apparatus for fluid catalytic cracking process, residual oil from apparatus for catalytic reforming of naphtha, cracked tar from apparatus for thermal cracking of crude oil, and mixtures thereof.

9. The oil composition according to claim 1 wherein the hydrogenation is carried out at 300° to 400° C. at 30 to 150 atom. in the presence of a hydrotreating catalyst.

10. The oil composition according to claim 1 wherein the hydrogenation is carried out at 150° to 300° C. and 30 to 150 atom. in the presence of a hydrogenating catalyst for aromatic hydrocarbons.

11. The oil composition according to claim 1 wherein said hydrogenated oil contains a compound selected from the group consisting of dihydronaphthalene, tetrahydronaphthalene, dihydroanthracene, dihydrophenanthrene, tetrahydroanthracene, tetrahydrophenanthrene, octahydroanthracene, octahydrophenanthrene, 5, 6, 7, 8-tetrahydro-2-naphtol, 1, 2, 3, 4-tetrahydroquinoline and mixtures thereof.

12. The oil composition according to claim 1 further comprising an additive selected from the group consisting of an anti-oxidation agent, detergent-dispersant, viscosity index improver, pour point depressant, oiliness agent, anti-wear agent, extreme pressure agent, corrosion inhibitor, metal deactivator, rust inhibitor, defoaming agent, emulsifier, anti-emulsifier, disinfectant, coloring agent, high polymer substances, brightening improver, cooling improver and mixtures thereof.

13. The oil composition according to claim 12 wherein said additives are contained in an amount up to 10 parts by weight based on 100 parts by weight of the oil composition.

14. The oil composition according to claim 12 wherein said cooling improver is selected from the group consisting of asphalt, polyvinyl chloride, polystyrene, acrylonitrile-styrene resin, polymethacrylate, silicone resin, polyvinyl butyral and mixtures thereof.

15. The oil composition according to claim 1 wherein the oil composition is a multi-functional oil selected from the group consisting of lubricating oil for internal combustion engines, industrial lubricating oil, turbine oil, aircraft oil, vessel oil, mold release agent, industrial grease, metal working oil, thermal medium oil, slide guiding surface oil and bearing oil.

16. The oil composition according to claim 15 wherein said metal working oil is selected from the group consisting of heat treating oil and electrical discharge machining oil.

17. The oil composition according to claim 1 further comprising a thickening agent.

18. The oil composition according to claim 17 wherein said thickening agent is selected from the group consisting of lithium soap, calcium complex soap, sodium terephthalamate, bentone, indanthrene, diurea, polyurea, urea-urethane and mixtures thereof.

19. The oil composition according to claim 17 wherein said thickening agent is contained in an amount of 2 to 30 parts by weight to 100 parts by weight of the base oil.

20. The oil composition according to claim 17 further comprising an additive selected from the group consisting of an anti-oxidation agent, detergent-dispersant, viscosity index improver, pour point depressant, oiliness agent, anti-wear agent, extreme pressure agent, corrosion inhibitor, metal deactivator, rust inhibitor, defoaming agent, emulsifier, anti-emulsifier, disinfectant, coloring agent, high polymer substances, brightening improver, cooling improver and mixtures thereof.

21. The oil composition according to claim 20 wherein said additives are contained in an amount up to 10 parts by weight based on 100 parts by weight of the oil composition.

22. The oil composition according to claim 20 wherein said cooling improver is selected from the group consisting of asphalt, polyvinyl chloride, polystyrene, acrylonitrile-styrene resin, polymethacrylate, silicone resin, polyvinyl butyral and mixtures thereof.

23. The oil composition according to claim 17 wherein the oil composition is a multi-functional oil selected from the group consisting of lubricating oil for internal combustion engines, industrial lubricating oil, turbine oil, aircraft oil, vessel oil, mold release agent, industrial grease, metal working oil, slide guiding surface oil and bearing oil.

* * * * *

UNITED STATES PATENT AND TRADEMARK OFFICE
CERTIFICATE OF CORRECTION

PATENT NO. : 5,015,404

DATED : May 14, 1991

INVENTOR(S) : Junichi KUBO et al.

It is certified that error appears in the above-identified patent and that said Letters Patent is hereby corrected as shown below:

On the title page:

In Section 30, Foreign Application Priority Data

Please insert:

-- Mar 13, 1989 [JP] Japan ..... 1-57901
Mar 13, 1989 [JP] Japan ..... 1-57902 --

Signed and Sealed this

Twenty-seventh Day of October, 1992

Attest:

DOUGLAS B. COMER

*Attesting Officer*   *Acting Commissioner of Patents and Trademarks*